United States Patent [19]
Nagasawa et al.

[11] Patent Number: 6,099,632
[45] Date of Patent: Aug. 8, 2000

[54] AQUEOUS PIGMENT INK COMPOSITION

[75] Inventors: Toshiyuki Nagasawa; Sohko Itoh; Tetsuji Kihara, all of Neyagawa, Japan

[73] Assignee: Orient Chemical Industries, Ltd., Osaka-fu, Japan

[21] Appl. No.: 09/121,306

[22] Filed: Jul. 23, 1998

[30] Foreign Application Priority Data

Jul. 24, 1997 [JP] Japan ..................... 9-198307

[51] Int. Cl.⁷ ..................... C09D 11/02
[52] U.S. Cl. ............. 106/31.9; 106/31.65; 106/472; 106/478
[58] Field of Search ............... 106/31.9, 31.65, 106/472, 478

[56] References Cited

U.S. PATENT DOCUMENTS

| | | | |
|---|---|---|---|
| 4,808,395 | 2/1989 | Yoshimura et al. | 106/472 |
| 5,184,148 | 2/1993 | Suga et al. | 106/31.9 |
| 5,542,969 | 8/1996 | Hirasa et al. | 106/31.9 |
| 5,968,244 | 10/1999 | Ueda et al. | 106/31.9 |

FOREIGN PATENT DOCUMENTS

| | | |
|---|---|---|
| 64-6074 | 1/1989 | Japan . |
| 64-31881 | 2/1989 | Japan . |
| 3-210373 | 9/1991 | Japan . |

*Primary Examiner*—Helene Klemanski
*Attorney, Agent, or Firm*—Birch, Stewart, Kolasch, & Birch, LLP

[57] ABSTRACT

Disclosed is an aqueous pigment ink composition comprising at least water and carbon black, wherein a surface oxygen content of said carbon black is not less than 0.07 in atom-numeral ratio based on carbon atom measured by an X-ray photoelectron spectroscopic method, and a combined value of a surface carboxyl group carbon content and a surface hydroxyl group carbon content of said carbon black, the both being measured by an X-ray photoelectron spectroscopic method, is not less than 0.5%. The aqueous pigment ink composition realizes smooth printing with an ink jet nozzle, and smooth writing with a fine pen tip and it has sufficient density. Further, the recorded traces obtained by using the ink composition is excellent in water resistance.

10 Claims, No Drawings

AQUEOUS PIGMENT INK COMPOSITION

FIELD OF THE INVENTION

The present invention relates to an aqueous pigment ink composition, particularly an aqueous pigment ink composition comprising carbon black as a coloring agent, of which water dispersibility is improved.

BACKGROUND OF THE INVENTION

An aqueous dye ink composition comprising black dye has been mainly used as a recording liquid for a writing implement and an ink jet printer. Recently, notice has been made on an aqueous pigment ink composition in which a pigment such as a carbon black is included to get the light resistance and water resistance of the resulting recorded traces.

Carbon black is commercially available as a coloring agent, however, it generally shows insufficient affinity and dispersion stability to aqueous medium. Therefore, the carbon black is necessary to be dispersed and stabilized in an aqueous medium by using a dispersing machine, in the presence of what is called a pigment dispersing agent, such as an aqueous acrylic resin, a stylene-(meth)acrylic acid resin, and a stylene-maleic acid resin, or amine.

For example, in Japanese Patent Kokai Publication No. 6074/1989 and 31881/1989, there is described an aqueous pigment ink composition comprising pigment dispersing agents (an anionic surface active agent and a polymeric dispersant) and carbon black having a pH value of not more than 5. Further, in Japanese Patent Kokai Publication No. 210373/1991, there is described an ink composition for ink jet recording, comprising a water-soluble resin and acidic carbon black.

In general, for stable discharging of droplets from the minute point of an ink jet recording head, and for smooth writing with the fine pen tip of an aqueous ball-point pen, it is required to prevent setting of the ink at the orifice of the ink jet recording head or at the tip of the ball-point pen.

However, when commercially available carbon black is used, the resulting pigment ink composition have to comprise a pigment dispersing agent. A resin which constitutes the pigment dispersing agent easily adheres to an orifice and the like, and it hardly dissolves again, therefore, orifice-clog or discharge-failure of droplets often occurs.

Further, an aqueous pigment ink composition containing a pigment dispersing agent is viscous, and it makes resistance throughout the route leading to a nozzle tip, when high-speed printing, or continuous discharging for a long period of time is conducted. Therefore, the discharging becomes unstable, and smooth recording becomes difficult. Further, in the conventional aqueous pigment ink composition, the pigment concentration can not be increased sufficiently, because discharging stability have to be maintained, and consequently, density of the resulting recorded traces becomes insufficient by comparison with an aqueous dye ink composition.

In order to solve the above-described problems, the inventors provide an aqueous pigment ink composition comprising no or a reduced amount of pigment dispersing agent. In the aqueous pigment ink composition described herein, the water dispersibility of carbon black used as a coloring agent is remarkably improved, and a resinous component such as a pigment dispersing agent does not have to be included. Therefore, this aqueous pigment ink composition does not cause clogging in a nozzle when it is used for ink jet recording, enables smooth writing with a fine pen point, and provides sufficient density of recorded traces.

SUMMARY OF THE INVENTION

The present invention provides an aqueous pigment ink composition comprising at least water and carbon black, wherein a surface oxygen content of said carbon black is not less than 0.07 in atom-numeral ratio based on carbon atom measured by an X-ray photoelectron spectroscopic method, and a combined value of a surface carboxyl group carbon content and a surface hydroxyl group carbon content of said carbon black, the both being measured by an X-ray photoelectron spectroscopic method, is not less than 0.5%.

Throughout the specification, the wording "a surface oxygen content" means the numeral ratio of an oxygen atom to a carbon atom which are present on a particle surface of carbon black (O/C atom-numeral ratio). The wording "a surface carboxyl group carbon content" means a percentage (%) of a carboxyl group carbon atom based on a carbon atom which are present on a particle surface of carbon black. The wording "a surface hydroxyl group carbon content" means a percentage (%) of a hydroxyl carbon atom based on a carbon atom which are present on a particle surface of carbon black.

The wording "a carboxyl group carbon atom" means a carbon atom contained in a carboxyl group, that is "C" of "—COOH". The wording "a hydroxyl group carbon atom" means a carbon atom which bonds to a hydroxyl group, that is "C" of "—C—OH". The wording "a surface functional group carbon content" comprises both the wordings "a surface carboxyl group carbon content" and "a surface hydroxyl group carbon content".

The carbon black employed as a pigment in an aqueous pigment ink composition of the present invention preferably has high surface oxygen content, high surface carboxyl group carbon content, and high hydroxyl group carbon content. This is because such carbon black shows good water dispersibility.

The carbon black having high surface oxygen content, high surface carboxyl group carbon content, and high hydroxyl group carbon content has many carboxyl groups and hydroxyl groups on a particle surface, and therefore hydrophilicity of the carbon black itself is improved. Furthermore, such carbon black essentially has large surface area. As a result, a particle surface of the carbon black is provided with the chemical property which is similar to a water-insoluble acidic dye, and water dispersibility of the carbon black becomes good. Whereas, a particle inside of the carbon black naturally has carbonaceous property, and the carbon black is hardly discolored by the sunlight or the heat, that is, superior in weather resistance and heat resistance.

The surface oxygen content of the carbon black contained in an aqueous pigment ink composition of the present invention is not less than 0.07, preferably not less than 0.1. The combined value of the surface carboxyl group carbon content and the surface hydroxyl group carbon content is not less than 0.5%, preferably not less than 0.7%.

Specifically, the surface carboxyl group carbon content is preferably not less than 0.3%, more preferably not less than 0.4%. The surface hydroxyl group carbon content is preferably not less than 0.2%, more preferably not less than 0.3%.

If the surface oxygen content of the carbon black is less than 0.07, or if the combined value of the surface carboxyl group carbon content and the surface hydroxyl group carbon content is less than 0.5%, dispersibility of the carbon black against an aqueous medium such as water becomes poor, and technical effect of the present invention may be prevented.

The surface oxygen content of the carbon black is measured according to an X-ray photoelectron spectroscopic method (The method may also be referred to as "XPS" or "ESCA"). The surface carboxyl group carbon content or the surface hydroxyl group carbon content of the carbon black is measured according to an X-ray photoelectron spectroscopic method modified by a gas phase chemical modification method (a label method), as follows.

That is, as to the surface carboxyl group carbon content, a carboxyl group present on a particle surface of carbon black is esterified under an atmosphere of trifluoroethanol, and thereafter, an amount of fluorine present on a particle surface of the carbon black is determined by an X-ray photoelectron spectroscopic method. As to the surface hydroxyl group carbon content, a hydroxyl group present on a particle surface of carbon black is esterified under an atmosphere of trifluoroacetic acid anhydride, and thereafter, an amount of fluorine present on a particle surface of the carbon black is determined by an X-ray photoelectron spectroscopic method.

A titration method and the like is generally employed as a method for determining an amount of a functional group present on a surface of carbon black. However, the measured value by the titration method often contains error due to the presence of $SO_x$, $NO_x$, or the like. Therefore, the X-ray photoelectron spectroscopic method modified by a gas phase chemical modification method is preferably employed in the present invention.

The carbon black employed in the present invention may be selected from the carbon black or channel black which are relatively highly oxidized, and from those having a specific amount of an oxygen-containing functional group.

Otherwise, the carbon black employed in the present invention may be prepared by adding an oxygen-containing functional group to a particle surface of commercially available neutral or acidic carbon black. The commercially available neutral or acidic carbon black is generally further oxidized in order to prepare the carbon black employed in the present invention.

Carbon black may be oxidized, for example, a gas phase oxidation method such as on contact with air, or on reaction with nitrogen oxide or ozone; and a liquid phase oxidation method such as on reaction with nitric acid, potassium permanganate, potassium bichromate, chlorous acid, perchloric acid, hypohalogenite, hydrogen peroxide, aqueous bromine, and aqueous ozone. A surface of carbon black may be modified by a plasma treatment and the like.

Particularly preferred method is the method of wet-oxidizing carbon black by using hypohalogenite (salt of hypohalogenous acid). Specific examples of the hypohalogenite include sodium hypochlorite, and potassium hypochlorite. The sodium hypochlorite is particularly preferred due to its high reactivity.

The oxidation reaction of carbon black is conducted by charging carbon black and hypohalogenite into suitable amount of water, and by stirring the resulting mixture for not less than 3 hours, preferably about 5 to 15 hours at a temperature of not less than 0° C., preferably not less than 5° C. Throughout the procedure, it is preferable that the carbon black is finely dispersed in the water. The carbon black is preferably oxidized with being dispersed to an average particle size of not more than 300 nm, preferably not more than 150 nm.

The finely dispersing step may be conducted before oxidizing step, by using a mill medium and a grinding apparatus. Otherwise, the finely dispersing step may be conducted simultaneously with the oxidizing step, by stirring or grinding carbon black in an aqueous solution of hypohalogenite.

The amount used of hypohalogenite differs depending on the kind thereof, and is usually from 5 to 250% by weight, preferably from 5 to 100% by weight in terms of 100% by weight based on the weight of carbon black.

The dispersion of the carbon black after the oxidizing step is filtrated (with heating), the resulting wet cake is dispersed again in water.

The water employed for preparing an aqueous pigment ink composition of the present invention is preferably deionized water. Ion-containing water such as tap water is not preferred, because ions such as Ca ion and Mg ion contained in the ion-containing water may deteriorate a performance, particularly dispersion stability of the resulting aqueous pigment ink composition.

Thereafter, beads and coarse particles are removed by using a mesh type wire fabric. Otherwise, after the beads and the coarse particles are removed, the resulting wet cake may be washed with water, preferably deionized water to remove by-produced salt. Alternatively, the slurry from which the beads and the coarse particles have been removed may be diluted with a large amount of water, preferably deionized water, and film purification and concentration may be conducted.

The wet cake of this oxidized carbon black is optionally dispersed again in water, preferably deionized water, and is acid-treated using mineral acid (for example, hydrochloric acid and sulfuric acid). The acid-treatment is preferably conducted by controlling the pH value of the aqueous dispersion to not more than 3, by adding hydrochloric acid, and heating at a temperature of not less than 80° C. for 1 to 5 hours with stirring. The acid-treatment is preferred, because, the formation of an ammonium salt or amine salt by aqueous ammonia or amine compound in the next step becomes advantageous by the acid-treatment. The acid-treatment removes sodium or potassium derived from an oxidation agent, in the form of salt. Then, the dispersion is filtrated and washed with water, preferably deionized water, and the resulting wet cake is dispersed again in water, preferably deionized water.

The dispersion of the carbon black is then optionally neutralized with a basic compound, preferably an amine compound. There are a lot of acidic groups on the surface of the carbon black, and at least a part of them (ionically) associates with an amine compound to form ammonium salt or amine salt. In this way, by neutralizing the carbon black with an amine compound, dispersion stability, prevention of clogging in a nozzle, and water resistance of recorded traces, of the aqueous pigment ink composition are improved.

The preferable amine compound includes a water-soluble volatile amine, alkanolamine and the like. The specific example includes ammonia, volatile amine substituted by an alkyl group having 1 to 3 carbon atoms (for example, methylamine, trimethylamine, diethylamine, propylamine); alkanolamine substituted by an alkanol group having 1 to 3 carbon atoms (for example, ethanolamine, diethanolamine, triethanolamine); alkylalkanolamine substituted by an alkanol group having 1 to 3 carbon atoms and an alkyl group having 1 to 3 carbon atoms, and the like. The particularly preferable amine compound is ammonia. However, it is not required that all the acidic groups are made into ammonium salt or amine salt.

These can be used in combination of more than one. Affinity and dispersion stability to an aqueous medium may be controlled. A part of the acidic groups which exist on the surface of the carbon black may be made into an alkali metal salt in order to prevent metal corrosion. In this case, sodium hydroxide, potassium hydroxide, lithium hydroxide and the like are used as a basic compound in combination with the amine compound.

Thereafter, the dispersion of the carbon black which has been made into amine salt is purified and concentrated, by using a separation film having small pores, preferably the pores of not more than 0.01 μm in diameter, such as a reverse osmosis membrane and ultrafiltration membrane. The concentration is generally conducted to obtain a concentrated pigment dispersion which has a carbon black content of from 10 to 30% by weight based on water. The resulting pigment dispersion can be used as an aqueous pigment ink composition. The concentration of the carbon black is however preferably controlled from 1 to 20% by weight. The concentrated pigment dispersion may be further dried to be powdery pigment, or may be further concentrated to be pigment dispersion having a pigment concentration of 50% by weight. Thereafter, these are dispersed in the aqueous medium described below, and concentration is suitably controlled to obtain the aqueous pigment ink composition of the present invention.

It is desirable that the carbon black used in the present invention is included in an amount usually from 0.1 to 50% by weight, preferably from 2 to 20% by weight, more preferably from 5 to 10% by weight based on the total amount of the aqueous pigment ink composition. When the carbon black content is less than 0.1% by weight, printing or writing density becomes insufficient, and when more than 50% by weight, the carbon black easily flocculates, or precipitates during storage for a long period, and discharging stability becomes poor.

The carbon black used in the aqueous pigment ink composition of the present invention has an average particle size of not more than 0.3 μm, preferably not more than 0.2 μm, more preferably not more than 0.15 μm. When the average particle size of the carbon black is more than 0.3 μm, the carbon black easily precipitates.

The aqueous pigment ink composition of the present invention optionally comprises a water-soluble resin. It is for the improvement of water resistance of a recorded traces which are obtained by recording with the aqueous pigment ink composition.

This water-soluble resin is different from the pigment dispersing agent conventionally employed as a pigment dispensing agent. The water-soluble resin do not have sufficient ability to disperse pigment. The reason for this is that the carbon black itself has excellent dispersibility and re-dispersibility in an aqueous medium.

In general, when lipophilic carbon black is dispersed in an aqueous solvent, a pigment dispersing agent should have a hydrophilic group and a lipophilic group arranged in good valance, and the lipophilic group should be adsorbed on the surface of the carbon black. However, the resin used in the present invention do not have to be adsorbed on the surface of the carbon black, and the lipophilic group may be weak by comparison with that of the usual pigment dispersing agent, and the arrangement thereof is not particularly limited. For example, a resin such as a block copolymer can be used without problems, as the water-soluble resin.

The dispersion stability and discharge stability of the aqueous pigment ink composition should not be lost by inclusion of the water-soluble resin. It is therefore necessary that the water-soluble resin prevents carbon black to become bulky agglomerates in drying. That is, the water-soluble resin have to cover the fine particles of the carbon black. Thereby, setting of the ink composition in an orifice or a nozzle is avoided, and speedy re-dissolution is achieved.

The water-soluble resin like that is generally an acrylic polymer having a weight average molecular weight of not more than 50000, preferably from 30000 to 1000, more preferably from 20000 to 1000, and having an acid value of from 100 to 250, preferably from 150 to 250. It is particularly preferable that these resins are soluble in an aqueous solution of an amine compound.

If the weight average molecular weight is not less than 50000, viscosity of the ink composition and particle size of the dispersion increases, and discharge stability may become poor. And if the acid value is not more than 100, re-dissolution property of the resin becomes undesirably poor. If the acid value is not less than 250, water-solubility becomes too high, and the water resistance of the resulting recorded traces becomes undesirably poor.

It is preferable that the water-soluble resin has a glass transition temperature of from 20 to 150° C., preferably from 30 to 100° C. If the glass transition temperature of the water-soluble resin is less than 20° C., printed ink becomes hard to dry, and tackiness remains undesirably for a long period. If more than 150° C., printed ink becomes hard and brittle, and cracks in bending may occur.

In the present specification, the term "acrylic polymer" means a polymer which is composed of at least one acrylic monomer such as acrylic acid, methacrylic acid, acrylate and methacrylate, and which has a carboxyl group.

The acrylic polymer is prepared by polymerizing the anionic monomers and nonionic monomers as exemplified below, in various ratio.

The example of the anionic monomers includes a monobasic acid unsaturated monomer such as acrylic acid and methacrylic acid, a dibasic acid unsaturated monomer such as maleic acid and itaconic acid, and a dibasic monoester such as monomethyl maleate and monobutyl itaconate.

The example of the nonionic monomer includes a (meth) acrylate such as methyl acrylate, ethyl acrylate, butyl acrylate, isobutyl acrylate, methyl methacrylate, ethyl methacrylate, isobutyl methacrylate, octyl methacrylate, 2-ethylhexyl methacrylate, lauryl methacrylate, dodecyl methacrylate, stearyl methacrylate, cyclohexyl methacrylate, benzyl methacrylate, 2-hydroxyethyl methacrylate, 2-hydroxypropyl methacrylate, glycidyl methacrylate, tetrahydrofuryl methacrylate, diethylene glycol mono (meth)acrylate, dipropylene glycol mono (meth) acrylate, ethylene glycol dimethacrylate, triethylene glycol dimethacrylate, tetraethylene glycol dimethacrylate, 1,3-butylene glycol dimethacrylate, trimethylolpropane trimethacrylate and the like; a dibasic ester such as dimethyl maleate, dibutyl maleate and the like; an aromatic vinyl monomer such as styrene, α-methylstyrene, vinyltoluene and the like; and a vinyl monomer such as acrylonitrile, methacrylonitrile, vinyl chloride, vinyl acetate and the like.

The specific example includes an acrylic acid-alkyl (meth)acrylate copolymer, methacrylic acid-alkyl (meth) acrylate copolymer, (meth)acrylic acid-maleic acid half ester copolymer, (meth)acrylic acid-dialkyl maleate copolymer, maleic acid-alkyl (meth)acrylate copolymer, itaconic acid-alkyl (meth)acrylate copolymer, methacrylic acid-2-hydoxyethyl (meth)acrylate copolymer, methacrylic acid-diethylene glycol (meth)acrylate copolymer, methacrylic acid-glycidyl methacrylate copolymer, styrene-acrylic acid copolymer, styrene-methacrylic acid copolymer, styrene-methacrylic acid-alkyl (meth)acrylate copolymer, styrene-maleic acid-alkyl (meth)acrylate copolymer and the like.

The acrylic polymer may be modified, by using a natural resin such as a rosin resin and a synthetic resin such as alkyd resin, epoxy resin, melamine resin, polyester, polyvinyl alcohol, polyether and the like.

The water-soluble resin which can be used in the aqueous pigment ink composition of the present invention is commercially available, and the example thereof includes, for example, a rosin-modified maleic acid resin "MULKYD 32" manufactured by Arakawa Kagaku Kogyo K.K., a styrenemaleic acid-modified acrylic resin "JOHNCRYL J501", and a styrene-acrylic (acid) resin "JOHNCRYL J-62" manufactured by Johnson Polymer K.K., and the like.

The acrylic polymer is preferably neutralized by a volatile basic compound selected from ammonia, amine, alkanolamine and alkylalkanolamine, and is dissolved in an aqueous medium. The acrylic polymer is contained in an amount of from 0.1 to 20% by weight, preferably from 0.5 to 10% by weight, more preferably from 0.5 to 5% by weight based on the total amount of the aqueous pigment ink composition of the present invention. The acrylic polymer is included in an amount of preferably from 10 to 100% by weight based the carbon black contained in the ink composition of the present invention.

The aqueous pigment ink composition of the present invention may optionally comprise a water-miscible organic solvent. In this specification, water, the water-miscible organic solvent and a mixture thereof are referred to as an aqueous medium.

The example of the water-miscible organic solvent includes an alkylalcohol having 1 to 4 carbon atoms such as methyl alcohol, ethyl alcohol, n-propyl alcohol, isopropyl alcohol, n-butyl alcohol, sec-butyl alcohol and isobutyl alcohol; ketone or ketone alcohol such as acetone and diacetone alcohol; ether such as tetrahydrofuran (THF) and dioxane; alkylene glycol such as ethylene glycol, propylene glycol, diethylene glycol and triethylene glycol; polyalkylene glycol such as polyethylene glycol and polypropylene glycol; lower alkyl ether of polyhydric alcohol such as ethylene glycol monoethyl ether, propylene glycol monomethyl ether, diethylene glycol monomethyl ether, diethylene glycol dimethyl ether, and triethylene glycol monoethyl ether; lower alkyl ether acetate such as polyethylene glycol monomethyl ether acetate; glycerine; and pyrrolidone such as 2-pyrrolidone, 2-methylpyrrolidone and N-methyl-2-pyrrolidone. The amount used of these organic solvents is not particularly limited, and usually in the range of from 3 to 50% by weight.

The aqueous pigment ink composition of the present invention is sufficiently desalted and purified, and there occurs no corrosion in writing implements, ink jet printer and the like. Further, the most of or a part of the carboxyl groups on the surface of the carbon black are converted to an ammonium salt. A part of the carboxyl groups may be converted to an alkaline metal salt by using alkaline metal (Na, K) salt of a hypohalogenous acid. It is preferred that pH of the aqueous pigment ink composition is controlled in the range between 5 to 10 as a conventional aqueous dye ink composition, in order to achieve good water dispersibility for a long period.

The aqueous pigment ink composition of the present invention, may comprises additives such as a viscosity regulating agent, mildewproofing agent and rustproofing agent, and various aqueous surface active agents (for example, cationic surface active agent having quarternary ammonium group, and anionic surface active agent having aromatic sulfonate group or having phosphonate group) which are conventionally employed in this kind of the ink composition, in an appropriate amount.

According to the present invention, there is provided an ink composition which contains the carbon black having high surface oxygen content, high surface functional group content, and large surface area at the same time. The carbon black therefore shows hydrophilicity, and excellent dispersibility against an aqueous medium.

The aqueous pigment ink composition of the present invention shows excellent dispersion stability for a long period, even if a pigment dispersing resin or a surfactant is not added, or if mechanical dispersion treatment is not conducted, therefore, the carbon black as pigment does not precipitate in an ink container. Further, when the aqueous pigment ink composition of the present invention is added with a specific water-soluble resin, water resistance of the recorded traces are further improved.

The aqueous pigment ink composition of the present invention shows excellent recording and writing properties when it is used as a recording ink in an ink jet method or as a writing ink of an aqueous ball point pen and the like, and enables high speed printing or writing. Thus, the written characters are not broken even when the ink composition is used for stenography.

Further, the recorded traces such as letters and figures on a normal paper or a non-absorptive coated paper show excellent fastness property (light resistance and water resistance), and even when the recorded traces are immersed in water, the carbon black does not flow out, and when the recorded traces are exposed to day light, there occurs no decoloring, as occurs in a dye ink composition.

Furthermore, the ink composition of the present invention can include a carbon black in high concentration, and density of the recorded traces are excellent, and it is equivalent to or more than that of a water-soluble black dye.

EXAMPLES

The present invention will be further illustrated in detail by the following examples, but they are not to be construed to limit the scope of the invention.

Example 1

Preparation of Pigment Dispersion 1

The commercially available acidic carbon black "RAVEN 1040" (235 g, pH 2.8) [manufactured by Columbian Carbon Japan K.K.], and 1300 g of sodium hypochlorite (effective chlorine concentration of 12%) were mixed in 1500 g of water and the mixture was finely dispersed by completely stirring with a dispersing machine at room temperature. The resulting slurry was filtrated, and was washed with water and deionized water until the pigment particles leaked out. This pigment wet cake was re-dispersed in deionized water, desalted by using a reverse osmosis membrane. The pigment dispersion was concentrated to a pigment concentration of 20% by weight.

The resulting pigment dispersion was further concentrated, dried and finely ground to obtain a fine powder of oxidized carbon black. The resulting oxidized carbon black had a surface oxygen content of 0.11, a surface carboxyl group carbon content [COOH/C (total)] of 0.4%, and a surface hydroxyl group carbon content [C—OH/C (total)] of 0.5%.

The surface oxygen content was measured according to an X-ray photoelectron spectroscopic method, by using "ESCALAB 220iXL" manufactured by England VG Company on the condition as shown in Table 1.

Table 1
X-ray for excitation: monochromatic ALK α 1,2-ray (1486.6 eV) X-ray diameter: 1000 μm ⌀ X-ray power: 10 kV / 24 mA
Photoelectron emission angle: about 90°(Detection depth: not more than about 10 nm)

The surface functional group carbon content (that is, the surface carboxyl group carbon content, or the surface hydroxyl group carbon content) was measured according to a gas phase chemical modification method, by using "SSX-100" manufactured by U.S. SSI Company on the condition as shown in Table 2.

Table 2
X-ray for excitation: monochromatic ALK α 1,2-ray (1486.6 eV) X-ray diameter: 1 mm ⌀ X-ray power: 10 kV / 20 mA
Photoelectron emission angle: about 35° (Detection depth: about a few nm)

Example 2

Preparation of Aqueous Pigment Ink Composition 1

To 25 g of the pigment dispersion obtained in Example 1 were added 5 g of ethanol and 5 g of 2-methylpyrrolidone and further was added deionized water to make up a total amount of 100 g, thereby an aqueous pigment ink composition was obtained. This ink composition had a viscosity of not more than 2 cps/25° C., and the carbon black had an average particle size of 0.15 μm.

Throughout the examples, the average particle size of the carbon black was measured by using a dynamic light scatter measuring apparatus (laser-doppler scattered light analysis mode, trade name: "MICROTRACK UPA", manufactured by LEEDS & NORTHRUP Corp.). The viscosities of the aqueous dispersion of oxidized carbon black and the aqueous pigment ink composition were measured by E type viscometer (trade name: "ELD", manufactured by Tokyo Keiki K.K.).

An ink jet recording apparatus [trade name: HG5130 (manufactured by Epson K.K.)] was charged with the pigment ink composition and printed. The printing did not cause clogging in a nozzle, and the printed traces had excellent water resistance. The dried traces were immersed in water, but the pigment did not flow out. The nozzle used was one for conventional aqueous dye ink. The pigment ink composition did not set in the nozzle, and no discharge failure occurred in the second printing test after several hours.

The ink composition was stored at 50° C. for 1 month, but the pigment did not precipitate, the average particle size and viscosity did not change. The printing test was conducted again. As a result, the discharging was stable and the writing was smooth. The optical density of solid printing portion was measured by Macbeth densitometer TR-927 (manufactured by Kolmorgen Corp.) to found 1.36. The value is fully sufficient.

Example 3

Preparation of Pigment Dispersion 2

The commercially available basic carbon black "RAVEN 780" (120 g, pH 7.4) [manufactured by Columbian Carbon Japan K.K.], and 600 g of sodium hypochlorite (effective chlorine concentration of 12%) were mixed in 2200 g of water and the mixture was finely dispersed by completely stirring at room temperature. To the mixture was further added 325 g of sodium hypochlorite, and the mixture was milled by using a beads mill apparatus. The resulting slurry was diluted with deionized water, desalted by using a ultrafiltration membrane, and concentrated to a pigment concentration of 20% by weight.

The resulting pigment dispersion was further concentrated, dried and finely ground to obtain a fine powder of oxidized carbon black. The resulting oxidized carbon black had a surface oxygen content of 0.08, a surface carboxyl group carbon content of 0.4%, and a surface hydroxyl group carbon content of 0.5%.

Example 4

Preparation of Aqueous Pigment Ink Composition 2

To 25 g of the pigment dispersion obtained in Example 3 were added 5 g of ethanol and 5 g of 2-methylpyrrolidone and further was added deionized water to make up a total amount of 100 g, thereby an aqueous pigment ink composition was obtained. This ink composition had a viscosity of not more than 2 cps/25° C., and the carbon black had an average particle size of 0.1 μm.

An ink jet recording apparatus [trade name: HG5130 (manufactured by Epson K.K.)] was charged with the pigment ink composition and printed. The printing did not cause clogging in a nozzle, and the printed traces had excellent water resistance. The dried traces were immersed in water, but the pigment did not flow out. The nozzle used was one for conventional aqueous dye ink. The pigment ink composition did not set in the nozzle, and no discharge failure occurred in the second printing test after several hours.

The ink composition was stored at 50° C. for 1 month, but the pigment did not precipitate, the average particle size and viscosity did not change. The printing test was conducted again. As a result, the discharging was stable and the writing was smooth. The optical density of solid printing portion was measured by Macbeth densitometer TR-927 (manufactured by Kolmorgen Corp.) to found 1.34. The value is fully sufficient.

Example 5

Preparation of Pigment Dispersion 3

The commercially available acidic carbon black "MONACH 1300" (100 g, pH 2.5) [manufactured by Cabot Corporation, Special Blacks Division], and 1085 g of sodium hypochlorite (effective chlorine concentration of 12%) were mixed in 1715 g of water and the mixture was finely dispersed by completely stirring with a dispersing machine. The resulting slurry was diluted with deionized water, acidified with an aqueous hydrochloric acid to pH2, and desalted by using a reverse osmosis membrane. An aqueous ammonia was added to the pigment dispersion until the pH thereof becomes 7.5, and the pigment dispersion was concentrated to a pigment concentration of 20% by weight.

The resulting pigment dispersion was further concentrated, dried and finely ground to obtain a fine powder of oxidized carbon black. The resulting oxidized carbon black had a surface oxygen content of 0.13, a surface carboxyl group carbon content of 0.5%, and a surface hydroxyl group carbon content of 0.6%.

Example 6

Preparation of Aqueous Pigment Ink Composition 3

To 25 g of the pigment dispersion obtained in Example 5 were added 5 g of ethanol and 5 g of 2-methylpyrrolidone, and further was added deionized water to make up a total amount of 100 g, thereby an aqueous pigment ink composition was obtained. This ink composition had a viscosity of not more than 2.3 cps/25° C., and the carbon black had an average particle size of 0.12 μm.

An ink jet recording apparatus [trade name: HG5130 (manufactured by Epson K.K.)] was charged with the pigment ink composition and printed. The printing did not cause clogging in a nozzle, and the printed traces had excellent water resistance. The dried traces were immersed in water, but the pigment did not flow out. The nozzle used was one for conventional aqueous dye ink. The pigment ink composition did not set in the nozzle, and no discharge failure occurred in the second printing test after several hours.

The ink composition was stored at 50° C. for 1 month, but the pigment did not precipitate, the average particle size and viscosity did not change. The printing test was conducted again. As a result, the discharging was stable and the writing was smooth. The optical density of solid printing portion was measured by Macbeth densitometer TR-927 (manufactured by Kolmorgen Corp.). The determined value is fully sufficient.

Comparative Example 1

To 5 g of the commercially available acidic carbon black "MA-100" (pH 3.5) [manufactured by Mitsubishi Kagaku K.K.] were added 85 g of deionized water, 5 g of ethanol, and 5 g of 2-methylpyrrolidone to make up a total amount of 100 g, and the mixture was completely stirred to obtain an aqueous pigment ink composition.

The acidic carbon black however did not disperse in water sufficiently, and supernatant was formed when the resulting dispersion was allowed to stand still for a few minutes. Therefore, the printing by using the dispersion was impossible.

Comparative Example 2

To 100 g of the commercially available acidic carbon black "MA-100" (pH 3.5) [manufactured by Mitsubishi Kagaku K.K.] were added 100 g of "JOHNCRYL J-62" [an aqueous solution of a styrene-acrylic (acid) resin manufactured by Johnson Polymer Co., Ltd.] and 300 g of deionized water, and the mixture was milled by a beads mill apparatus until an average particle size became about 150 nm.

To 25 g of the pigment dispersion were added 5 g of ethanol and 5 g of 2-methylpyrrolidone, and further was added deionized water to make up a total amount of 100 g, and the mixture was completely stirred to obtain an aqueous pigment ink composition. This ink composition had a viscosity of not more than 4 cps/25° C., and had good dispersion stability.

The ink jet recording apparatus was charged with the aqueous pigment ink composition in the same manner as Example 1, and printed on a normal paper. The amount discharged of the ink composition became small, and density of the printed traces gradually decreased, and finally the discharge of ink stopped. Further, in the second printing test after several hours, the nozzle clogged and did not recover.

Comparative Example 3

An aqueous pigment ink composition was prepared by mixing 25 g of a pigment dispersion prepared in comparative example 2, 10 g of diethylene glycol, 10 g of 2-methylpyrrolidone, and 55 g of deionized water. Ink jet printing could be conducted by using the resulting aqueous pigment ink composition repetitively, and discharge failure did not occur at a nozzle.

On the other hand, the ink composition was stored at 50° C. for 1 month. The average particle size of carbon black and the viscosity of the ink composition were thereafter measured. The results are that the carbon black particles were agglomerated to become an average particle size of 0.2 μm, and the viscosity of the ink composition was increased to 7 cps/25° C.

Ink jet printing was then conducted by using the resulting aqueous pigment ink composition. However, the agglomerate of the carbon black particles was clogged at a nozzle of the ink jet recording apparatus, and no ink was discharged from the nozzle.

As summarized in the following Table 3, the surface oxygen content, the surface carboxyl group carbon content, the surface hydroxyl group content, and water dispersibility were compared with respect to the carbon black obtained in Examples 1, 3, and 5 of the present invention, the commercially available carbon black "COLOUR BLACK FW 200", "MA 100" and "#45" (respectively manufactured by Degussa Corp., Mitsubishi Kagaku K.K., and Mitsubishi Kagaku K.K.).

TABLE 3

| Carbon Black | Oxygen[1] (ratio) | Functional[2] (%) —COOH | Functional[2] (%) —C—OH | Water Dispersibility[3] ≦pH6 | Water Dispersibility[3] ≧pH7 |
|---|---|---|---|---|---|
| Ex. 1 | 0.11 | 0.4 | 0.5 | ◎ | ◎ |
| Ex. 3 | 0.08 | 0.4 | 0.5 | ◎ | ◎ |
| Ex. 5 | 0.13 | 0.5 | 0.6 | ◎ | ◎ |
| FW 200 | 0.08 | 0.2 | 0.2 | Δ | Δ |
| MA 100 | 0.03 | 0.1 | 0.1 | X | X |
| #45 | 0.01 | — | — | X | X |

[1]Surface oxygen content
[2]Surface functional group carbon content
[3]◎ . . . stable not less than 60 days
Δ . . . stable not more than 10 minutes
X . . . stable not more than 1 minutes As shown in Table 3, the carbon black having a surface oxygen content of not less than 0.07, and a surface functional group carbon content (i.e., a combined value of a surface carboxyl group carbon content and a surface hydroxyl group carbon content) of not less than 5.0 showed good water dispersibility. That is, the carbon black used in the present invention was finely dispersed quickly and was stable after it was allowed to stand still for 60 days at a pigment concentration of 20%. Therefore, the aqueous pigment ink composition containing this carbon black may provide an ink composition for ink jet recording excellent in discharge stability, as illustrated in Examples 2, 4, and 6.

Whereas, the commercially available "MA-100" has a surface oxygen content of 0.03, a surface carboxyl group carbon content of 0.1%, and a surface hydroxyl group carbon content of 0.1%. That is, the carbon black is poor in hydrophilicity. The carbon black therefore floated on a water surface, even in the beginning of the dispersing step, or it precipitated with the lapse of time.

The other commercially available carbon black "#45", "MONACH 1300", "COLOUR BLACK FW200", "RAVEN 1040", and "RAVEN 780" are also poor in water dispersibility. Therefore, an aqueous pigment ink composition containing the commercially available carbon black cannot provide an ink composition for ink jet recording excellent in discharge stability, as illustrated in Comparative Examples.

The particle size of carbon black contained in an aqueous pigment ink composition of the present invention, was found to be about 0.15 µm, when an aqueous resin such as an acrylic resin, a stylene-acrylic acid resin, and a stylene-maleic acid resin was absent in the aqueous pigment ink composition. The particle size is particularly suitable for an ink composition for an ink jet recording apparatus, or for a writing implement.

What is claimed is:

1. An aqueous pigment ink composition comprising at least water and carbon black, wherein a surface oxygen content of said carbon black is not less than 0.07 in atom-numeral ratio based on carbon atom measured by an X-ray photoelectron spectroscopic method, and a combined value of a surface carboxyl group carbon content and a surface hydroxyl group carbon content of said carbon black, the both being measured by an X-ray photoelectron spectroscopic method, is not less than 0.5%.

2. The aqueous pigment ink composition according to claim 1, wherein the surface carboxyl group carbon content measured by an X-ray photoelectron spectroscopic method is not less than 0.3%, and the surface hydroxyl group carbon content measured by an X-ray photoelectron spectroscopic method is not less than 0.2%.

3. The aqueous pigment ink composition according to claim 1, wherein the combined value of a surface carboxyl group carbon content and a surface hydroxyl group carbon content, the both being measured by an X-ray photoelectron spectroscopic method, is not less than 0.7%.

4. The aqueous pigment ink composition according to claim 3, wherein the surface carboxyl group carbon content measured by an X-ray photoelectron spectroscopic method is not less than 0.4%, and the surface hydroxyl group carbon content measured by an X-ray photoelectron spectroscopic method is not less than 0.3%.

5. The aqueous pigment ink composition according to claim 1, wherein at least a part of an acidic group existing on the surface of said oxidized carbon black forms alkali metal salt, ammonium salt, and/or amine salt.

6. The aqueous pigment ink composition according to claim 1, wherein the carbon black has an average particle size of not more than 0.3 µm.

7. The aqueous pigment ink composition according to claim 1, wherein the carbon black is that prepared by wet-oxidizing carbon black using hypohalogenous acid and/or salt thereof.

8. The aqueous pigment ink composition according to claim 1, wherein the composition comprises the carbon black in an amount of 0.1 to 50% by weight based on a total weight of the aqueous pigment ink composition.

9. An ink composition for an ink jet recording apparatus which comprises the aqueous pigment ink composition of claim 1.

10. An ink composition for a writing implement which comprises the aqueous pigment ink composition of claim 1.

* * * * *